United States Patent
Ueda et al.

(10) Patent No.: US 10,935,528 B2
(45) Date of Patent: Mar. 2, 2021

(54) ANALYSIS DEVICE

(71) Applicant: SHIMADZU CORPORATION, Kyoto (JP)

(72) Inventors: Manabu Ueda, Kyoto (JP); Jun Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 188 days.

(21) Appl. No.: 16/307,650

(22) PCT Filed: Jun. 28, 2016

(86) PCT No.: PCT/JP2016/069124
§ 371 (c)(1),
(2) Date: Dec. 6, 2018

(87) PCT Pub. No.: WO2018/003011
PCT Pub. Date: Jan. 4, 2018

(65) Prior Publication Data
US 2019/0170712 A1  Jun. 6, 2019

(51) Int. Cl.
*G01N 30/86* (2006.01)
*G01N 30/72* (2006.01)
*G01N 30/88* (2006.01)
*G01N 30/62* (2006.01)

(52) U.S. Cl.
CPC ......... *G01N 30/8631* (2013.01); *G01N 30/72* (2013.01); *G01N 30/86* (2013.01);
(Continued)

(58) Field of Classification Search
CPC ........... G01N 30/8631; G01N 30/8679; G01N 30/8641; G01N 2030/8872; G01N 2030/625
See application file for complete search history.

(56) References Cited

U.S. PATENT DOCUMENTS 9,960,027 B2 * 5/2018 McAlister ............. H01J 49/425
2013/0238254 A1 * 9/2013 Nakamura ......... G01N 30/8641
702/25
(Continued)

FOREIGN PATENT DOCUMENTS

CN          103328966 A        9/2013
CN          103376299 A        10/2013
(Continued)

OTHER PUBLICATIONS

International Search Report for PCT/JP2016/069124 dated Sep. 13, 2016 (PCT/ISA/210).
(Continued)

*Primary Examiner* — Paul M. West
(74) *Attorney, Agent, or Firm* — Sughrue Mion, PLLC

(57) ABSTRACT

The detection of minute amounts of components that have been undetectable due to an influence of a mobile phase or reagents or the like added to the mobile phase is realized in LC-MS. At the outset, blank measurement is executed, and an m/z value $M_{BG}$ of a background signal derived from a mobile phase or the like is extracted on a mass spectrum obtained by the blank measurement (S2-S4). An analysis method is then created that executes scanning measurement in a plurality of divided m/z ranges in which the m/z value $M_{BG}$ of the background signal has been excluded from a predetermined m/z range. An LC/MS analysis of the target sample is executed according to the analysis method (S5-S6). When a total ion chromatogram (TIC) is created from data obtained by the LC/MS analysis, influence of the background signal hardly appears in the TIC, and the base line is lowered.

4 Claims, 5 Drawing Sheets

(52) U.S. Cl.
CPC ..... *G01N 30/8641* (2013.01); *G01N 30/8679* (2013.01); *G01N 30/7206* (2013.01); *G01N 30/7233* (2013.01); *G01N 2030/625* (2013.01); *G01N 2030/8872* (2013.01)

(56) References Cited

U.S. PATENT DOCUMENTS

| | | | |
|---|---|---|---|
| 2013/0289893 A1 | 10/2013 | Kawase | |
| 2013/0297226 A1 | 11/2013 | Wang | |
| 2013/0311109 A1* | 11/2013 | Yao | G16C 20/20 |
| | | | 702/23 |
| 2016/0005581 A1* | 1/2016 | Graichen | H01J 49/0031 |
| | | | 250/282 |

FOREIGN PATENT DOCUMENTS

| | | |
|---|---|---|
| JP | 63-135854 A | 6/1988 |
| JP | 63-168960 A | 7/1988 |
| JP | 10-185873 A | 7/1998 |
| JP | 2000-131284 A | 5/2000 |
| JP | 2005-221276 A | 8/2005 |
| JP | 2013-228295 A | 11/2013 |
| JP | 2015-152350 A | 8/2015 |
| WO | 03/087770 A2 | 10/2003 |
| WO | 2016/044079 A1 | 3/2016 |

OTHER PUBLICATIONS

Written Opinion dated Sep. 13, 2016 in application No. PCT/JP2016/069124.
Communication dated Jul. 23 2019, from the Japanese Patent Office in counterpart Application No. 2018-524618.
Communication dated Jun. 11, 2019, from the European Patent Office in counterpart European Application No. 16907244.4.
Office Action dated Dec. 28, 2020 in Chinese Application No. 201680087362.6.

* cited by examiner

ANALYSIS DEVICE

CROSS REFERENCE TO RELATED APPLICATIONS

This application is a National Stage of International Application No. PCT/JP2016/069124 filed Jun. 28, 2016, the disclosure of which is incorporated herein in its entirety by reference.

TECHNICAL FIELD

The present invention relates to an analysis device such as a chromatograph mass spectrometer which is a combination of a liquid chromatograph (LC) or a gas chromatograph (GC) and a mass spectrometer, or a spectrophotometer.

BACKGROUND ART

In the liquid chromatograph mass spectrometer, various compounds contained in a sample are temporally separated from each other with a liquid chromatograph, the separated compounds are detected with a mass spectrometer, and an intensity signal corresponding to the content is acquired for each compound. When the compound contained in the sample is unknown or when an unknown compound should be detected, in general, scanning measurement in a predetermined mass to charge ratio range is repeatedly performed in the mass spectrometer, so that even a compound having an unknown mass can be detected without fail.

In the field of synthetic chemistry such as manufacture and development of pharmaceutical products and manufacture and development of agrichemical products, it is important to examine impurities, other than target compounds, contained in the sample. A general procedure of detecting impurities with a liquid chromatograph mass spectrometer is as follows.

(1) A chromatogram (a total ion chromatogram) is created based on data obtained by LC/MS measurement of a sample, and an impurity-derived peak is detected on the chromatogram. In general, a peak having a signal intensity that has a predetermined fraction of a signal intensity (a peak height) of a peak derived from a known target compound (usually, this peak is a main peak having a maximum signal intensity) or larger is detected as an impurity peak.

(2) A mass spectrum obtained around a peak top position of the detected impurity peak (the retention time) is examined, and a mass to charge ratio of the impurity is determined from the position of a peak that appears on the mass spectrum. In some cases, the impurity can be estimated from the mass to charge ratio alone or from the mass to charge ratio and the retention time.

In recent years, there is an increasing demand for the detection of minute amounts of impurities contained in a sample. However, in the conventional liquid chromatograph mass spectrometer described above, as illustrated in FIG. 5A, the base line of the total ion chromatogram rises due to influence of additives and buffering agents present in or added to a mobile phase used in the liquid chromatograph, foreign materials contained in the mobile phase, and the like. This causes the peaks of minute amounts of impurities hidden in the base line, thus making it impossible to detect the minute amounts of impurities in some cases.

Patent Literature 1 discloses, as a conventional device, a device that removes the influence of a background noise by subjecting a blank sample containing a solvent only and no sample component to a GC/MS analysis to obtain and store a chromatogram or a mass spectrum having a background noise and subtracting the chromatogram or mass spectrum having the background noise from a chromatogram or a mass spectrum obtained by a GC/MS analysis of a target sample. However, even if such process is performed, an impurity peak hidden in the base line raised by the background noise cannot be found in the chromatogram.

Further, the gas chromatograph mass spectrometer which is a combination of a gas chromatograph and a mass spectrometer also poses a similar problem due to impurities contained in a carrier gas.

CITATION LIST

Patent Literature

Patent Literature 1: JP 2000-131284 A

SUMMARY OF INVENTION

Technical Problem

The present invention has been made in view of the above problems, and a first object of the present invention is to provide an analysis device, such as a chromatograph mass spectrometer, capable of detecting minute amounts of components that have not been able to detect due to an influence of a mobile phase in a liquid chromatograph or reagents added to the mobile phase, or due to impurities and the like contained in a carrier gas contained in a gas chromatograph.

A second object of the present invention is to provide an analysis device in which an analysis method including analysis conditions and the like can be easily created, where the analysis method is used in performing an analysis for the detection of minute amounts of components which have not been able to detect as described above.

Solution to Problem

In order to solve the above problems, according to a first aspect of the present invention, there is provided an analysis device capable of obtaining a spectrum in a predetermined value range for a predetermined parameter by executing an analysis according to an analysis method including analysis conditions, the analysis device including:

a) a background information storage unit that stores a parameter value of a background signal that appears in the analysis; and b) an analysis method creation unit that creates, when one or a plurality of parameter values or a parameter value range are set as one of the analysis conditions, an analysis method in which one or a plurality of parameter values or a parameter value range obtained by removing the parameter value stored in the background information storage unit from the set one or the plurality of parameter values or the set parameter value range are used as an analysis object.

In the analysis device according to the first aspect of the present invention and a second aspect of the present invention that will be described later, the parameter is, for example, a mass to charge ratio or a wavelength (or a wave number). When the parameter is the mass to charge ratio, the analysis device according to the present invention is, for example, a mass spectrometer such as an induction binding plasma mass spectrometer (ICP-MS) and a matrix supported laser elimination ionization time-of-flight mass spectrometer (MALDI-TOFMS), a liquid chromatograph mass spectrometer, or a gas chromatograph mass spectrometer, and the spectrum is a mass spectrum. When the parameter is a wavelength, the analysis device according to the present invention is, for example, a spectrophotometer such as a photodiode array detector (PDA), an UV spectrophotometer, or a Fourier transformation infrared spectrophotometer (FTIR), and the spectrum is an absorption spectrum or a fluorescence spectrum.

When the analysis device according to the present invention is a mass spectrometer, the mass spectrometer may be, for example, a single-type mass spectrometer, such as a quadrupole mass spectrometer, that does not fractionate ions, or a mass spectrometer, such as a triple quadrupole mass spectrometer, that can perform an MS/MS analysis.

When the analysis device according to the first aspect of the present invention is a chromatograph mass spectrometer that detects, with a mass spectrometer, components chromatographically temporally separated, the configuration may be such that:

the background information storage unit stores a mass to charge ratio of a background signal that appears in the analysis; and the analysis method creation unit creates, when one or a plurality of mass to charge ratios or a mass to charge ratio range are set as a repetitive analysis object as one of the analysis conditions, an analysis method in which one or a plurality of mass to charge ratios or a mass to charge ratio range obtained by removing the mass to charge ratio stored in the background information storage unit from the set mass to charge ratio or the set mass to charge ratio range are used as a repetitive analysis object.

When the analysis device according to the first aspect of the present invention is a liquid chromatograph mass spectrometer, the mass to charge ratio of a background signal that appears in the analysis is stored in the background information storage unit. The background signal referred to here is typically derived from a mobile phase used in the liquid chromatograph or various reagents added to the mobile phase, and is present in substantially the whole total ion chromatogram. The background signal sometimes varies at every user or at every analysis. Further, the background signal may also depend on other conditions such as the flow rate of the mobile phase and the type of the column.

Accordingly, the liquid chromatograph mass spectrometer according to the first aspect of the present invention may be configured to further include a background information acquiring unit that extracts a parameter value of the background signal, that is, a mass to charge ratio, based on results obtained by a blank analysis, and stores the mass to charge ratio in the background information storage unit. In this configuration, the blank analysis is actually performed without injecting a sample into the mobile phase or by injecting a sample containing a solvent only into the mobile phase, and the background information acquiring unit extracts a mass to charge ratio of the background signal, for example, from a mass spectrum obtained by the blank analysis. Thus, the mass to charge ratio of a background signal that appears in the mobile phase used in the analysis or under other conditions can be accurately determined.

The analysis method creation unit determines a mass to charge ratio or a mass to charge ratio range obtained by excluding the mass to charge ratio stored in the background information storage unit from one or a plurality of mass to charge ratios or a mass to charge ratio range are set as the repetitive analysis object as one of the analysis conditions by a user or automatically. Specifically, for example, when repetitive scanning measurement is set in a predetermined mass to charge ratio range, a mass to charge ratio range obtained by excluding one or a plurality of mass to charge ratios stored in the background information storage unit from the mass to charge ratio range, that is, a mass to charge ratio range with the range being disconnected at an intermediate position, is determined. When repetition of SIM (selective ion monitoring) measurement or MRM (multiple reaction monitoring) measurement using a plurality of mass to charge ratios as the target has been set, one or a plurality of mass to charge ratios obtained by excluding one or a plurality of mass to charge ratios stored in the background information storage unit from the plurality of mass to charge ratios are determined.

In the analysis method created by the analysis method creation unit, ions having the mass to charge ratio of the background signal are excluded from the analysis object. Accordingly, the background signal does not appear in the total ion chromatogram or the mass spectrum obtained by the analysis according to the analysis method, and, as long as the mass to charge ratio of the background signal is not the same as the mass to charge ratio of the impurity-derived ion, a peak of a minute-amount of component such as an impurity that has not been able to observe due to hiding of the peak in the background signal, for example, on a total ion chromatogram can be observed.

In the analysis device in the first aspect of the present invention, the background information storage unit may be a database that stores parameter values of background signals under various conditions. Various conditions referred to here are conditions under which way of appearance of the background signals may vary as described above. For example, in the liquid chromatograph mass spectrometer, in addition to the mobile phase and the type of various reagents added to the mobile phase, the flow rate of the mobile phase, the type of the column, and the like may be included. The database may be created by a user or alternatively may be provided by a manufacturer of the device.

In order to solve the above problem, according to the second aspect of the present invention, there is provided an analysis device capable of obtaining a spectrum in a predetermined value range for a predetermined parameter by executing an analysis according to an analysis method including analysis conditions, the analysis device including:

a) an exclusion information setting unit that sets a parameter value or a parameter value range to be excluded from an analysis object; and b) an intensity value determination unit that removes the parameter value set by the exclusion information setting unit, on a spectrum obtained by an analysis of a sample, determines whether or not the signal intensity value is larger than a predetermined threshold value with the parameter value remaining in the parameter value to determine a parameter value at which the peak has the signal intensity value that is larger than the threshold value.

In the analysis device according to the second aspect of the present invention, "the parameter value or the parameter value range to be excluded from the analysis object" may be, for example in the analysis device according to the first aspect, a parameter value of a background signal stored in the background information storage unit, or a parameter value range having a predetermined width and including the parameter value.

When the analysis device according to the second aspect of the present invention is a chromatograph mass spectrometer that detects, with a mass spectrometer, components chromatographically temporally separated, the analysis device may be configured so that:

the exclusion information setting unit sets a mass to charge ratio or a mass to charge ratio range to be excluded from the analysis object; and the intensity value determination unit removes the mass to charge ratio or the mass to charge ratio range set by the exclusion information setting unit, on a spectrum obtained by an analysis of a sample, and determines whether or not the signal intensity value is larger than a predetermined threshold value using mass to charge ratios other than the mass to charge ratio to determine a mass to charge ratio in which the signal intensity value is larger than the threshold value.

When the analysis device according to the second aspect of the present invention is a liquid chromatograph mass spectrometer and when a mass spectrum is obtained by an LC/MS analysis of a sample, the intensity value determination unit removes the mass to charge ratio or the mass to charge ratio range set in the exclusion information setting unit on the mass spectrum, and whether or not the signal intensity value is larger than the threshold value is determined at a mass to charge ratio other than the removed mass to charge ratio or mass to charge ratio range. That is, even when any peak having a large intensity is present at any mass to charge ratio within the mass to charge ratio or the mass to charge ratio range set in the exclusion information setting unit, the peak is neglected and only a peak in which the signal intensity value is larger than a predetermined threshold value at a mass to charge ratio other than the mass to charge ratio is extracted.

Accordingly, as described above, when the mass to charge ratio of the background signal is set in the exclusion information setting unit, in the intensity value determination unit, a significant component other than the background signal, that is, a mass to charge ratio of ions derived from a target compound or an impurity or the like can be determined.

The analysis device according to the second aspect of the present invention may be configured to further include a chromatogram creation unit that creates an extraction ion chromatogram (conventionally referred to as a masschromatogram) in a mass to charge ratio obtained in the intensity value determination unit using data obtained by an analysis of the sample.

According to this configuration, an extraction ion chromatogram in which a target compound or an impurity-derived peak in the sample is observed can be automatically created, and the amount of an impurity can be determined, for example, from a peak area value on the chromatogram.

When the analysis device according to the second aspect of the present invention is a chromatograph mass spectrometer that executes an analysis according to an analysis method including analysis conditions, the analysis device may be configured to further include an analysis method creation unit that creates an analysis method that uses, as a repetitive analysis object, the mass to charge ratio obtained in the intensity value determination unit.

In this configuration, for example, the analysis method creation unit creates an analysis method that executes SIM measurement using, as a target, the mass to charge ratio obtained by the intensity value determination unit. When the mass spectrometer can perform an MS/MS analysis, an analysis method is created that executes product ion scanning measurement in which the mass to charge ratio obtained in the intensity value determination unit is a precursor ion, and MRM measurement in which the obtained mass to charge ratio is a precursor ion while a mass electrolysis ratio that has been predetermined corresponding to the mass to charge ratio is a product ion. Thus, an analysis method that executes an analysis using, as a target, a target compound or an impurity in a sample can be automatically created without an influence on the background signal.

In the analysis device according to the second aspect of the present invention, for example, SIM measurement may be performed immediately after detecting a component as a target during the analysis without creating the analysis method for the SIM measurement or the like as described above.

That is, in the analysis device according to the second aspect of the present invention, the intensity value determination unit may further include an analysis control unit that determines a mass to charge ratio at which the signal intensity value is larger than the threshold value, based on a mass spectrum obtained in a substantially real time during execution of an analysis of a sample and that, when the mass to charge ratio has been obtained, controls each unit to execute SIM measurement, product ion scanning measurement, or MRM measurement with the mass to charge ratio being a target.

In this configuration, when a component to be focused is noticed during the execution of the LC/MS analysis or GC/MS analysis, for example, SIM measurement using the component as a target is rapidly performed. Accordingly, there is no need to again perform LC/MS analysis or GC/MS analysis of the same sample for the creation of the extraction ion chromatogram for the component. Therefore, an analysis efficiency can be enhanced, and, at the same time, the amount of the sample to be analyzed can be small.

Advantageous Effects of Invention

According to the analysis device in the first aspect of the present invention, for example, the minute amounts of impurities that have not been able to detect due to an influence of a mobile phase or reagents or the like in a liquid chromatograph, or an influence of impurities in a carrier gas in a gas chromatograph, can be detected on a chromatogram. Further, according to the analysis device in the first aspect of the present invention, since an influence of minute amounts of impurities can be removed in executing an analysis according to the created analysis method, unlike a method in which the background is removed by processing data after collection of data, the presence or absence of impurities can be confirmed on a real time basis during the execution of the analysis. Further, the analysis method for the execution of the analysis can be automatically created, and thus burden on users can be reduced.

According to the analysis device in the second aspect of the present invention, for example, a mass to charge ratio of ions derived from minute amounts of impurities that have not been able to detect due to an influence of a mobile phase or reagents or the like in the liquid chromatograph, or an influence of impurities in a carrier gas in the gas chromatograph can easily be confirmed. Further, an analysis method for the execution of an analysis using the impurities as the target can be automatically created. Furthermore, the retention time of impurities can be confirmed by detecting a peak on an extraction ion chromatogram at a mass to charge ratio of impurity-derived ions.

DESCRIPTION OF EMBODIMENTS

First Example

Figure 1:
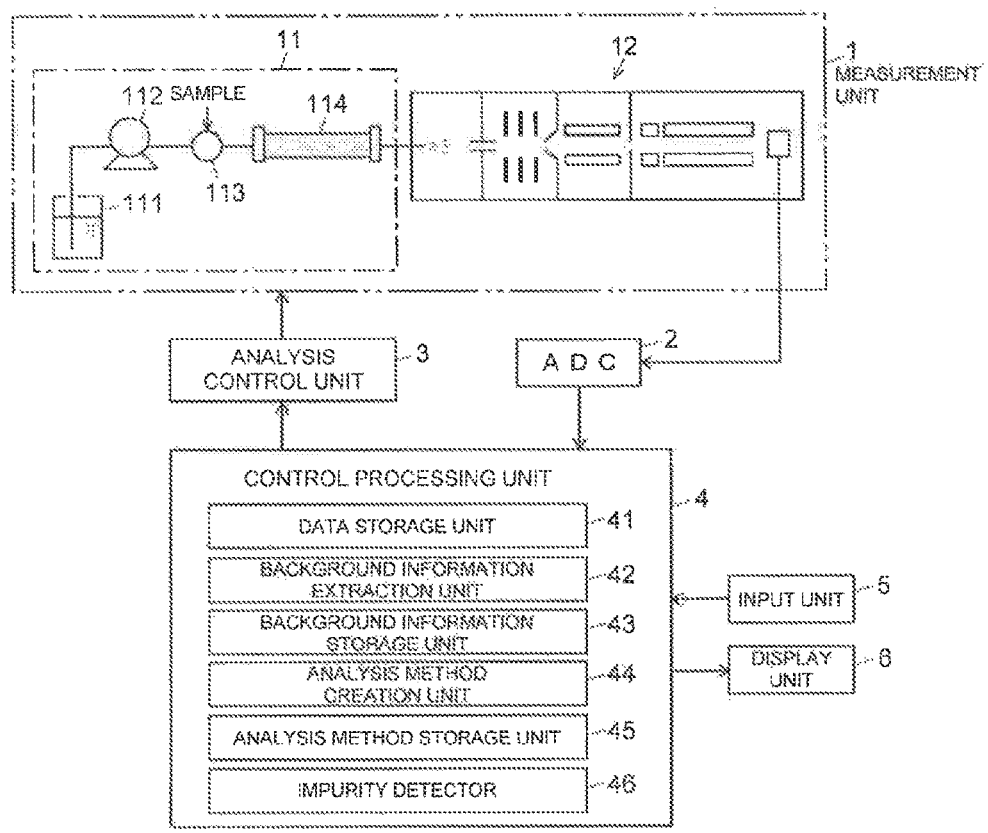
FIG. 1 is a configuration diagram of a principal part of LC-MS according to a first example of the present invention.

LC-MS according to a first example of the present invention will be described with reference to the accompanying drawings. FIG. 1 is a configuration diagram of a principal part of LC-MS of the first example.

A measurement unit 1 includes a liquid chromatograph (LC unit) 11 and a mass spectrometer (MS unit) 12. The liquid chromatograph 11 includes a liquid feed pump 112 that suctions a mobile phase from a mobile phase container 111 and supplies the mobile phase, an injector 113 that injects a sample into the mobile phase, and a column 114 that separates individual components in the sample. On the other hand, the mass spectrometer 12 is a quadrupole mass spectrometer provided with a quadrupole mass filter as a mass spectrograph.

The detection signal obtained in the measurement unit 1 is converted to digital data in an analog digital converter (ADC) 2 and is input into a control processing unit 4. The control processing unit 4 to which an input unit 5 and a display unit 6 are connected includes function blocks such as a data storage unit 41, a background information extraction unit 42, a background information storage unit 43, an analysis method creation unit 44, an analysis method storage unit 45, and an impurity detector 46. Further, the control processing unit 4 controls the action of the measurement unit 1 through an analysis control unit 3.

Each function of the control processing unit 4 can be implemented by executing, on a personal computer, a dedicated controlling and processing software program previously installed in the personal computer.

Characteristic action in LC-MS of the first example will be described with reference to FIGS. 2 to 5.

Figure 2A:
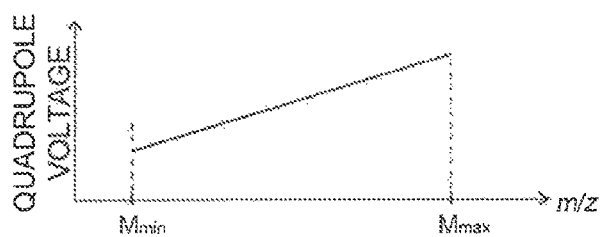
FIGS. 2A and 2B are explanatory diagrams illustrating scanning measurement of LC-MS of the first example.
Figure 2B:
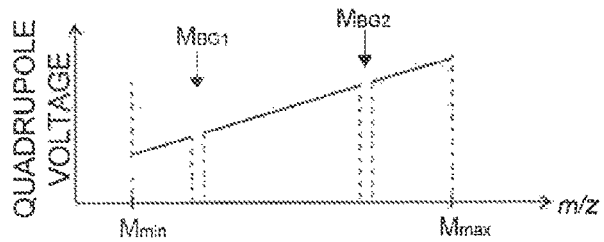
Figure 3:
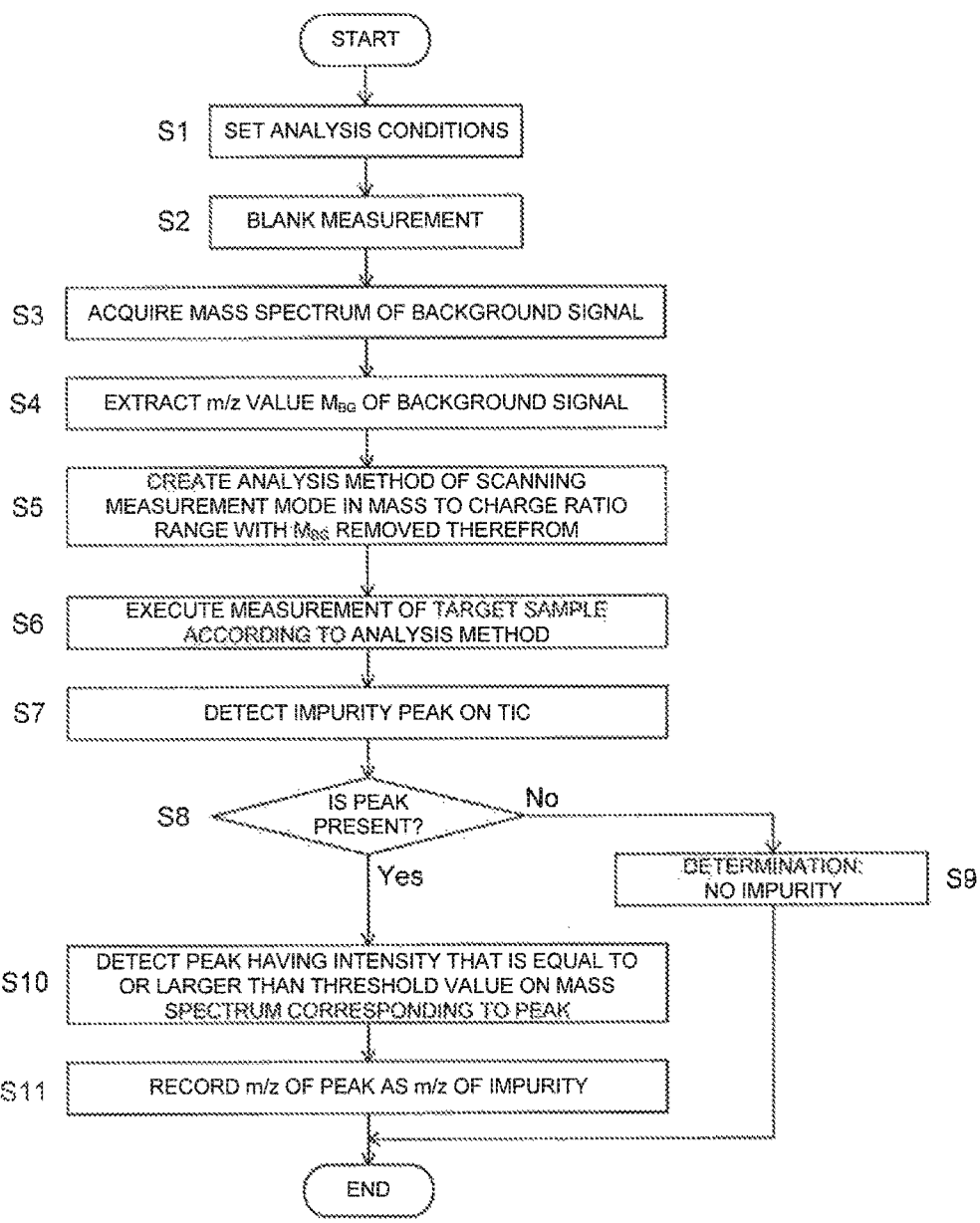
FIG. 3 is a flow chart illustrating a procedure of an impurity confirmation process in LC-MS of the first example.
Figure 4:
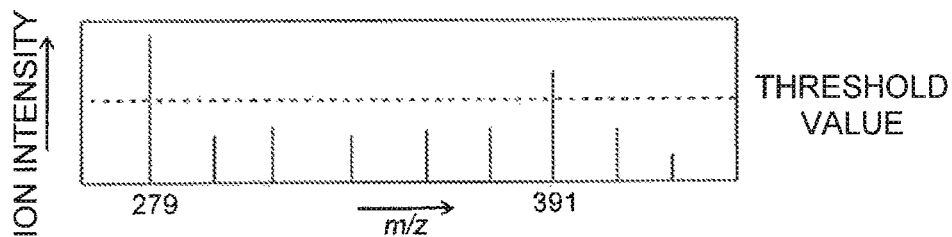
FIG. 4 is a graph illustrating an example of a mass spectrum obtained in a blank analysis.
Figure 5A:
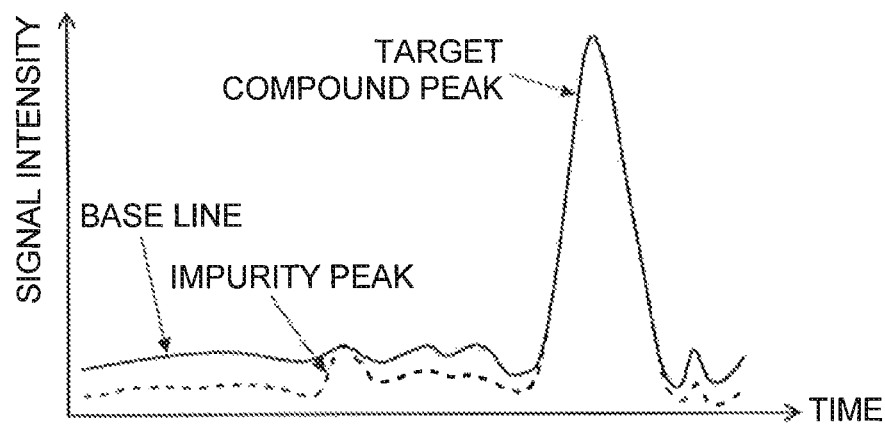
FIG. 5A is a graph illustrating an example of a total ion chromatogram with a background signal not removed from the total ion chromatogram and FIG. 5B is a graph illustrating an example of a total ion chromatogram with a background signal removed from the total ion chromatogram.
Figure 5B:
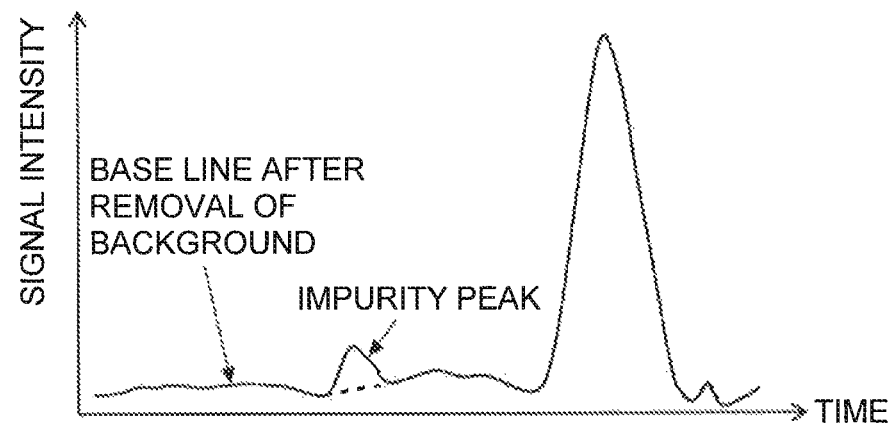

FIG. 3 is a flow chart illustrating the control and process of impurity detection in LC-MS of the present example, FIGS. 2A to 2B are explanatory diagrams illustrating scanning measurement of LC-MS of the present example, FIG. 4 is a graph illustrating an example of a mass spectrum obtained in a blank analysis, and FIG. 5A is a graph illustrating an example of a total ion chromatogram (TIC) with a background signal not removed from the total ion chromatogram and FIG. 5B is a graph illustrating an example of TIC with a background signal removed from the total ion chromatogram.

At the outset, a user sets, using an input unit 5, analysis conditions including a mass to charge ratio range (that is, lower limit value $M_{min}$ and upper limit value $M_{max}$) for the scanning measurement performed in a mass spectrometer 12 (step S1). The set analysis conditions are once stored in an analysis method storage unit 45. Next, the analysis control unit 3 that have received an instruction from the control processing unit 4 executes blank measurement by controlling the measurement unit 1 according to the previously stored analysis conditions (step S2). In the blank measurement, in the liquid chromatograph 11, a sample is not injected into a mobile phase, or a sample containing a solvent only is injected into the mobile phase. The mass spectrometer 12 repeatedly performs scanning measurement in a mass to charge ratio range of $M_{min}$ to $M_{max}$. FIG. 2A schematically illustrates a voltage applied to a quadrupole mass filter of the mass spectrometer 12 in the scanning measurement.

In the blank measurement, a sample component is not introduced into the mass spectrometer 12, and thus, components in the mobile phase are mainly reflected in a mass spectrum obtained in the scanning measurement. That is, data constituting a mass spectrum of a background signal derived from components in the mobile phase are stored in a data storage unit 41 (step S3).

Next, the background information extraction unit 42 extracts a peak in which an intensity value is equal to or larger than a predetermined threshold value in a mass spectrum of a background signal, and a mass to charge ratio of the peak is determined as a mass to charge ratio $M_{BG}$ of the background signal (step S4). Here, for example, when a mass spectrum of a background signal illustrated in FIG. 4 has been obtained, m/z 279 and 391 corresponding to two peaks in which the intensity value is equal to or larger than the threshold value are extracted as a mass to charge ratio $M_{BG}$ of the background signal.

Next, an analysis method creation unit 44 determines a mass to charge ratio range in which the mass to charge ratio $M_{BG}$ of the background signal in the previously set mass to charge ratio range $M_{min}$ to $M_{max}$ for scanning measurement has been excluded, and creates an analysis method using the determined mass to charge ratio range as a scanning measurement object (step S5). When $M_{min}$ to $M_{max}$ are m/z 250 to 500 and $M_{BG1}$ and $M_{BG2}$ are m/z 279 and m/z 391, respectively, as illustrated in FIG. 2B, three mass to charge ratio ranges, that is, m/z 250 to 278, 280 to 390, and 392 to 500, are a scanning measurement object. In this connection, for one mass to charge ratio, the width of a mass to charge ratio to be excluded (±1 in the above example) may be properly varied. Thus, an analysis method in which the mass to charge ratio range in the scanning measurement object has been varied is stored in an analysis method storage unit 45.

Subsequently, the analysis control unit 3 controls the measurement unit 1 so as to execute an LC/MS analysis of a target sample according to the analysis method created in step S5 (step S6). At that time, in the column 114, various components are temporally separated and are introduced into a mass spectrometer 12. In this case, components causative of the background signal (for example, components in the mobile phase) are also introduced into the mass spectrometer 12. In this case, the mass to charge ratio of ions derived from components causative of the background signal is excluded from the scanning measurement object, and thus the intensity of ions derived from the components is not reflected in collected data.

Data obtained by the LC/MS analysis of the target sample are stored in the data storage unit 41. After the completion of the analysis, the impurity detector 46 creates TIC based on data stored in the data storage unit 41. A peak having maximum signal intensity on the TIC is regarded as a main peak. A threshold value that occupies a predetermined proportion relative to the signal intensity of the main peak is determined, and a peak having a signal intensity that is equal to or larger than the threshold value is detected as an impurity peak (step S7). As described above, a main background signal derived, for example, from the mobile phase is not reflected in data that are analysis results. Accordingly, as illustrated in FIG. 5B, in the TIC, rising of the base line by the background signal does not occur. As a result, even a very small impurity peak hidden in the base line in the conventional device can be detected.

When a peak is not detected on the TIC (No in step S8), the impurity detector 46 determines that no impurity is present (step S9). On the other hand, when a peak has been detected on the TIC (Yes in step S8), a spectrum peak having a signal intensity that is equal to or larger than a predetermined threshold value is detected on a mass spectrum obtained around the retention time of the peak (step S10). The mass to charge ratio of the spectrum peak is then determined, and the determined mass to charge ratio is recorded or displayed as a mass to charge ratio of the impurity (step S11).

In the first example, basically, a series of processes or controls are automatically performed. Alternatively, a part of the series of processes or controls may be manually performed by a user. For example, in step S7, after the creation of TIC, the TIC is displayed on a screen of the display unit 6, and operation after that, that is, for example, confirmation of an impurity peak on the TIC and confirmation of the mass to charge ratio of an impurity on the mass spectrum when the impurity is present may be manually performed by a user. Further, in step S4, in the extraction of the mass to charge ratio of the background signal from the mass spectrum, a mass spectrum displayed on the screen of the display unit 6 may be confirmed by a user and the mass to charge ratio of the background signal may be manually selected by the user.

Furthermore, in the first example, in the blank measurement or the LC/MS analysis of the target sample, the scanning measurement in the predetermined mass to charge ratio range is performed. The scanning measurement may not be substantially continuous scanning of the mass to charge ratio. For example, the mass to charge ratio may be varied at a predetermined step width within a predetermined mass to charge ratio range (for example, 1 Da or 2 Da). This may be regarded as a combination of many SIM measurements, or may be regarded as intermittent scanning measurement. Further, the mass of impurities contained in the sample can be estimated, or when whether or not a known impurity is present or absent is examined. SIM measurement using, as the target, a mass to charge ratio corresponding to the mass of the impurity may be performed.

Furthermore, in the first example, subsequent to the determination of the mass to charge ratio of the background signal based on results of blank measurement performed, an LC/MS analysis of the target sample is executed. Alternatively, in the LC/MS analysis of the target sample, background information may be acquired in a period between the injection of the sample into the mobile phase and the appearance of a first peak, and an analysis method may be changed during the analysis based on the results of the background information to acquire data on individual components in the sample. Further, instead of performing blank measurement to acquire background information, background information may be acquired together with acquisition of data for other purposes other than the analysis of the target sample. For example, background information may be obtained at the time of acquisition of calibration line data or studies on analysis conditions such as a mobile phase, a column, or a gradient. Further, the background information may be obtained at the time of optimization of voltage/gas or the like of the device. In particular, when the mass spectrometer 12 is a triple quadrupole mass spectrometer, the mass spectrometer 12 has a function of automatic optimization of collision induction dissociation energy or the like. Accordingly, a function of acquiring background information may be included in the automatic optimization function. Alternatively, background information may be obtained at the time of validation of a measuring method. Further, when the mass spectrometer 12 is a mass spectrometer using a MALDI ion source, background information may be obtained in studying a matric effect.

In LC-MS in the first example, mass to charge ratios of background signals under various conditions may be determined beforehand and stored beforehand in the background information storage unit 43 and, in the analysis of a target sample, the mass to charge ratio of the background signal corresponding to analysis conditions or under conditions closest to the analysis conditions may be read out from the storage unit 43 to create an analysis method. Various conditions referred to here may include the type of mobile phase used, the type or concentration of various reagents added to the mobile phase, the velocity of flow of the mobile phase, and the type of column used. This is a kind of database including various analysis conditions associated with mass to charge ratios of the background signal. When the database is utilized, TIC in which background signals have been satisfactorily removed without blank measurement for each analysis of the target sample can be obtained.

Further, background information under various conditions other than the above LC separation conditions can previously be stored and utilized. For example, background information may be stored for each pretreatment in solid phase extraction (reversed phase or normal phase) or liquid phase extraction, each sample storage container (vial, vial cap, mobile phase bin, or column), each internal standard reagent to be used, each ion pair reagent, and further, each sample lot and each purity. Furthermore, background information may be stored for each sample type (for example, ○○ for spinach, ●● for tomato, and XX for mouse), and each ionization method in the mass spectrometer (for example, ○○ for ESI method, and ●● for APCI). Furthermore, in the measurement of impurities in culture cells, background information appropriate to culture time, each cell of culture source, culture temperature or the like may be stored. In metabolomics or other analysis, background information may be stored according to "sample as comparison object". Further, background information may be stored in each matrix (substance other than sample, and coexisting substance) (for example, the matrix being plasma and urine in a biological sample). Furthermore, the background information may be included in a method package previously provided to a user from a manufacturer of the device.

Further, in the LC-MS in the first example, an LC/MS analysis of a target sample is performed according to the created analysis method to create the TIC or the like. In an imaging mass spectrometer that will be described later, a mass spectrometric imaging image is created from data acquired based on information with background information excluded and is displayed.

Second Example

Next, LC-MS according to a second example of the present invention will be described with reference to the accompanying drawings.

Figure 6:
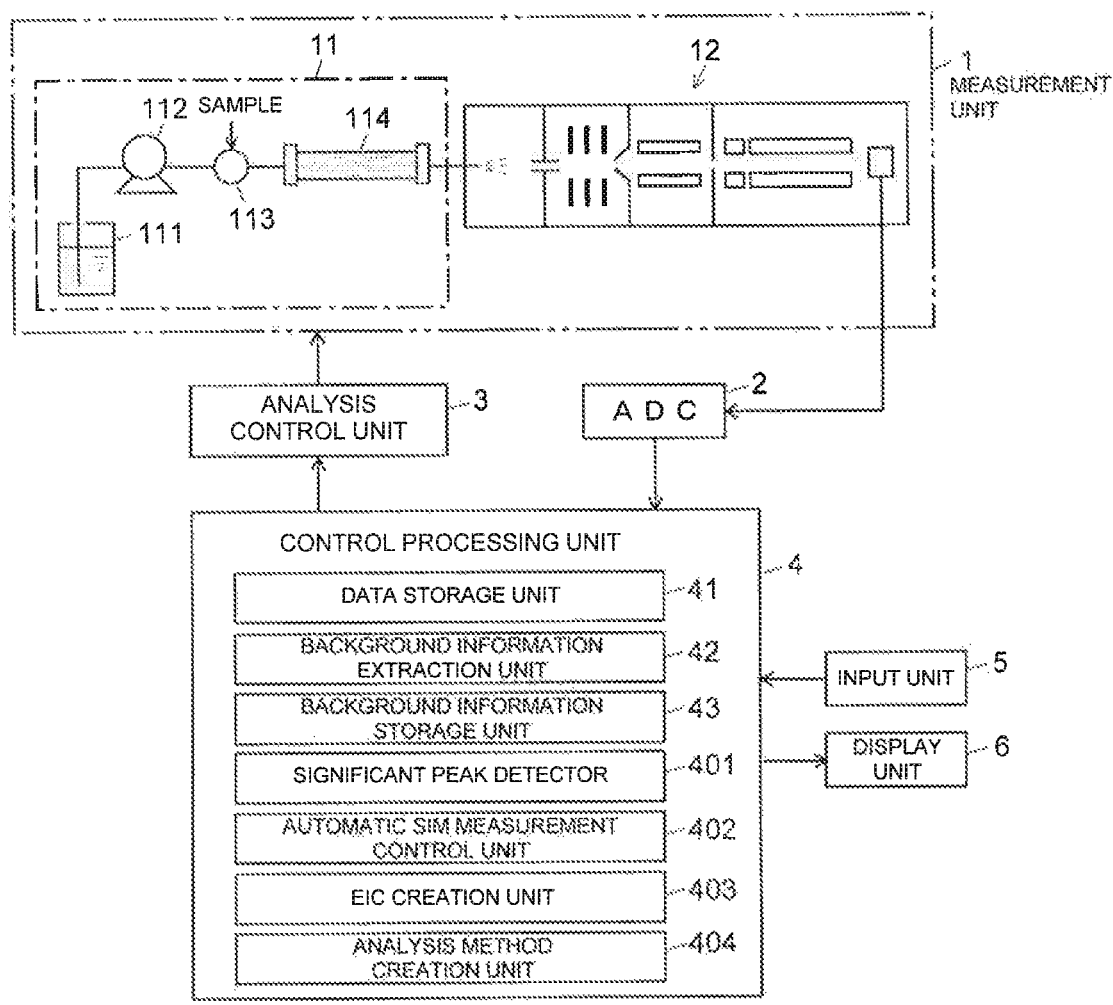
FIG. 6 is a configuration diagram of a principal part of LC-MS according to a second example of the present invention.

FIG. 6 is a configuration diagram of a principal part of LC-MS according to the second example of the present invention, and, in FIG. 6, the same elements as those in the LC-MS of the first example in FIG. 1 have the same reference numerals. A measurement unit 1, ADC 2, and an analysis control unit 3 are the same as those in the LC-MS in the first example. A control processing unit 4 includes, in addition to a data storage unit 41, a background information extraction unit 42, and a background information storage unit 43 that are the same as those in the LC-MS in the first example, functional blocks such as a significant peak detector 401, an automatic SIM measurement control unit 402, an EIC creation unit 403, and an analysis method creation unit 404.

Characteristic action in the LC-MS of the second example will be described with reference to FIGS. 7 and 8.

Figure 7:
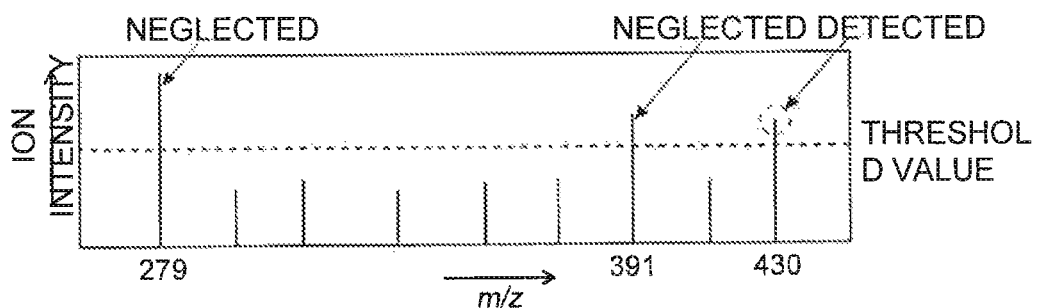
FIG. 7 is an explanatory diagram illustrating significant peak detection action in LC-MS of the second example.
Figure 8:
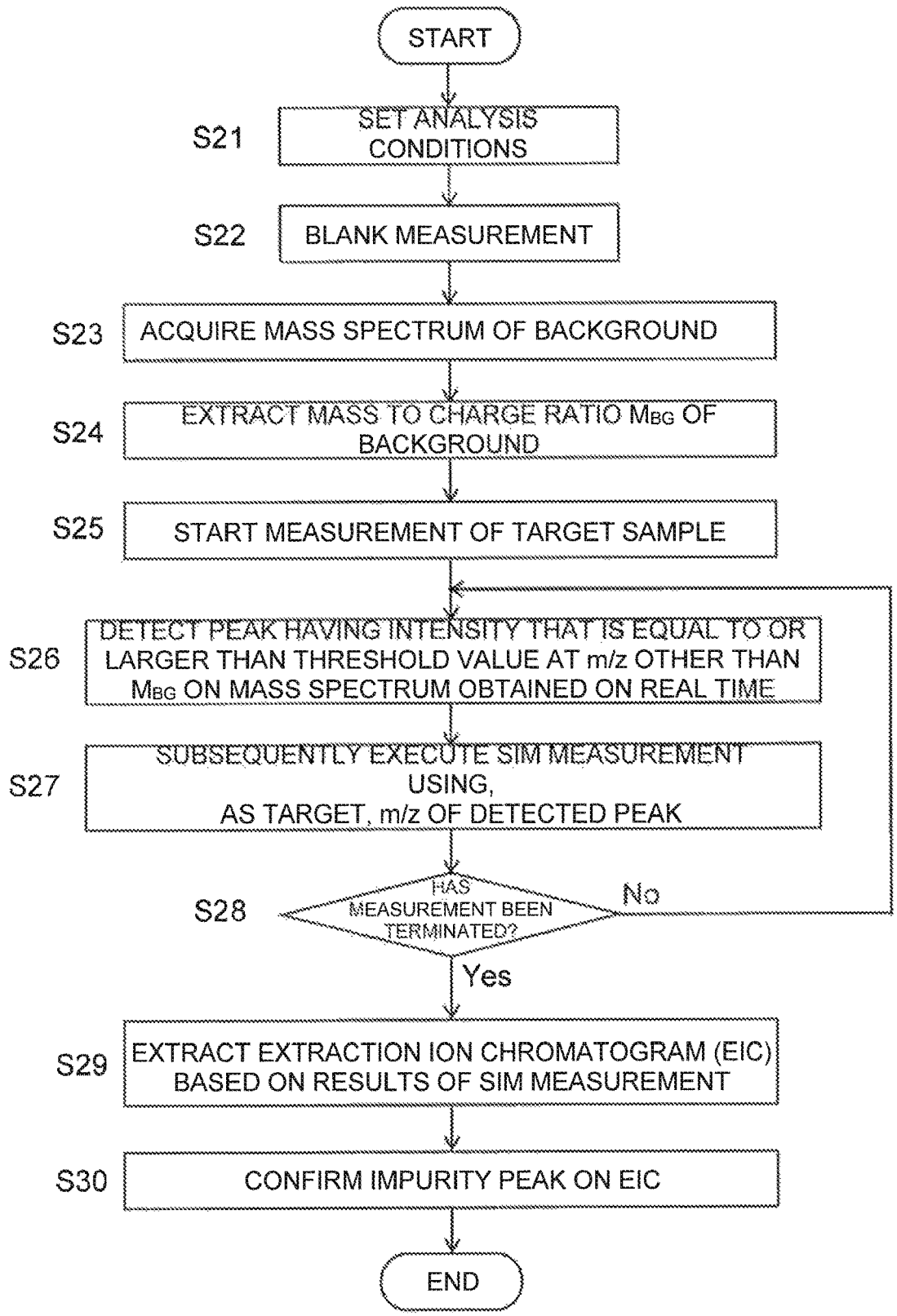
FIG. 8 is a flow chart illustrating a procedure of the impurity confirmation process in LC-MS of the second example.

FIG. 8 is a flow chart illustrating the control and process of impurity detection in the LC-MS in the second example, and FIG. 7 is an explanatory diagram illustrating significant peak detection action in LC-MS of the second example.

In FIG. 8, processes of steps S21 to S24 is the same as that in steps S1 to S4 in FIG. 3, and a mass to charge ratio $M_{BG}$ of the background signal is stored in the background information storage unit 43. Thereafter, in LC-MS of the second example, the analysis control unit 3 controls the measurement unit 1 so as to execute an LC/MS analysis of a target sample and measurement is started (step S25). At that time, in the same manner as in the blank measurement, scanning measurement is performed in a predetermined mass to charge ratio range $M_{min}$ to $M_{max}$ in the mass spectrometer 12.

Every time when scanning measurement is performed for a target sample, the significant peak detector 401 creates a mass spectrum on a real time basis based on the obtained date and a significant peak is detected on the mass spectrum. In this case, a peak at a mass to charge ratio $M_{BG}$ of the background signal stored in the background information storage unit 43 is neglected independently of the intensity. At other mass to charge ratios, peaks having an intensity that is equal to or larger than a threshold value are regarded as significant peaks (step S26). When $M_{BG}$s are m/z 279 and m/z 391 and a mass spectrum as illustrated in FIG. 7 is obtained, peaks of m/z 279 and m/z 391 are neglected and only a peak of m/z 430, that is, having an intensity that is equal to or larger than a threshold value, is regarded as a significant peak.

When a significant peak has been detected in step S26, the automatic SIM measurement control unit 402 controls the measurement unit 1 so as to subsequently execute SIM measurement using the mass to charge ratio in the detected peak as the target (step S27). For example, when the detected peak is an impurity-derived peak, the time period in which the impurity is introduced and present in the mass spectrometer 12 is limited. Accordingly, SIM measurement may be executed in only a predetermined period of time from a point of time when a peak at a certain mass to charge ratio has been detected as a significant peak, or alternatively a method may be adopted in which SIM measurement and scanning measurement are performed in a time division manner each for a short period of time and, only in a period of time in which the peak in the mass to charge ratio is detected as a significant peak, SIM measurement is performed using the mass to charge ratio as the target. When measurement termination conditions are not satisfied, for example, when the time reaches a predetermined measurement termination time, the process returns from step S28 to step S26.

Accordingly, when a significant peak is present on a mass spectrum created on a real time basis by repetition of steps S26 to S28, SIM measurement using the mass to charge ratio in the peak as the target is performed and data on a change in ion intensity at the mass to charge ratio with the elapse of time are stored in a data storage unit 41. An ion peak derived from a component causative of the background signal is also observed on the mass spectrum. However, this peak is not extracted as a significant peak, and thus SIM measurement using the mass to charge ratio of the background signal as the target is not of course performed. When the measurement is terminated, the EIC creation unit 403 creates an extraction ion chromatogram at a specific mass to charge ratio based on data obtained by SIM measurement and stored in the data storage unit 41 and extracts the extraction ion chromatogram on a screen of the display unit 6 (step S29). The user confirms the displayed extraction ion chromatogram, for example, a retention time of the impurity is grasped and, at the same time, a mass to charge ratio of the impurity is grasped from the mass to charge ratio of the target (step S30).

As a matter of course, a peak derived from a target compound in the sample is also detected as a significant peak. When the detection of this peak is not necessary, setting may be performed so that, in the detection of a significant peak, a known mass to charge ratio corresponding to the target compound is also neglected. Thus, only an extraction ion chromatogram in which an impurity is observed can be created.

In the LC-MS of the second example, SIM measurement is executed immediately after the appearance of an impurity during an LC/MS analysis. In an LC/MS analysis of the same type of samples, when an analysis method that can execute SIM measurement for the detection of the same type of impurities is created, a flow chart illustrated in FIG. 8 can be changed as follows. That is, every time when a significant peak has been detected in step S26, the mass to charge ratio of the peak and the time range in which the peak has been detected (retention time) are stored. After the termination of the measurement, the analysis method creation unit 404 may automatically create an analysis method in which SIM measurement using, as the target, mass to charge ratios in all detected significant peaks is performed in a time period range corresponding to the peaks. The analysis method can be used for identification or quantitative determination of an impurity (whether or not the impurity is present) in the same type of other samples (for example, samples such as pharmaceutical products in other lots in which the target compound is identical).

In the second example, the mass spectrometer 12 in the measurement unit 1 is a typical single-type quadrupole mass spectrometer. Alternatively, the mass spectrometer 12 may be a triple quadrupole mass spectrometer with which an MS/MS analysis can be performed. In this case, in the second example, instead of SIM measurement, typical measurement modes used in the MS/MS analysis may be used such as execution of Q1 scanning (mass scanning in a quadrupole mass filter at a former stage), Q3 scanning (mass scanning in a quadrupole mass filter at a later stage), product ion scanning, precursor ion scanning, and neutral loss scanning, or execution of MRM measurement in which, for mass to charge ratio of a significant peak, the mass to charge ratio of precursor ions and the mass to charge ratio present for each mass to charge ratio of the precursor ions are used as the mass to charge ratio of product ions.

It is needless to say that the present invention can also be applied in a similar manner to mass spectrometers other than quadrupole mass spectrometers, for example, time-of-flight mass spectrometers, ion trap-type mass spectrometers, and induction binding plasma mass spectrometers. Further, it is a matter of course that the present invention can also be applied in a similar manner to gas chromatograph mass spectrometers rather than liquid chromatograph mass spectrometer. Further, the present invention can also be utilized in imaging mass spectrometers utilizing MALDI-TOFMS or the like.

Furthermore, it is apparent that, also in various spectrophotometers that can acquire spectrum other than mass spectrum, specifically absorption spectrum or a fluorescence spectrum, the present invention can be applied when the background signal appears at a specific wavelength or in wavelength range.

Furthermore, also at other points, any modifications, changes, or additions within the spirit and scope of the present invention are embraced in the scope of claims in the present application.

REFERENCE SIGNS LIST

1 . . . Measurement Unit
11 . . . Liquid Chromatograph (LC)
111 . . . Mobile Phase Container
112 . . . Liquid Feed Pump
113 . . . Injector
114 . . . Column
12 . . . Mass Spectrometer (MS)
2 . . . Analog Digital Converter (ADC)
3 . . . Analysis Control Unit
4 . . . Control Processing Unit
41 . . . Data Storage Unit
42 . . . Background Information Extraction Unit
43 . . . Background Information Storage Unit
44 . . . Analysis Method Creation Unit
45 . . . Analysis Method Storage Unit
46 . . . Impurity Detector
401 . . . Significant Peak Detector
402 . . . Automatic SIM Measurement Control Unit
403 . . . EIC Creation Unit
404 . . . Analysis Method Creation Unit
5 . . . Input Unit
6 . . . Display Unit

The invention claimed is:

1. An analysis device comprising a mass spectrometer capable of obtaining a spectrum in a predetermined mass to charge ratio value range by executing an analysis according to an analysis method including analysis conditions, the analysis device being configured to detect, with the mass spectrometer, a component temporally separated by a chromatograph, the analysis device comprising:
 a) a background information storage unit that stores a mass to charge ratio value of a background signal that appears in analysis;
 b) an analysis method creation unit that creates, wherein one or a plurality of mass to charge ratio values or a mass to charge ratio value range are set as one of the analysis conditions, an analysis method in which one or a plurality of mass to charge ratio values or a mass to charge ratio value range obtained by removing the mass to charge ratio value stored in the background information storage unit from the set mass to charge ratio value or the set mass to charge ratio value range are used as an analysis object;
 c) a chromatogram acquisition unit that creates a total ion chromatogram based on results obtained by an analysis of a target sample according to the analysis method; and
 d) a peak detector being an impurity detector that detects, except for a main peak whose signal intensity is maximum on the total ion chromatogram, a peak in which the proportion of a signal intensity on the total ion chromatogram to a signal intensity of the main peak on the total ion chromatogram is equal to or larger than a predetermined threshold value, as an impurity peak corresponding to an impurity contained in the target sample.

2. The analysis device according to claim 1, further comprising
 a background information acquiring unit that extracts a mass to charge ratio value of a background signal based on results obtained by a blank analysis and stores the extracted mass to charge ratio value in the background information storage unit.

3. The analysis device according to claim 1, wherein
 the background information storage unit is a database that stores mass to charge ratio values of background signals under various conditions.

4. The analysis device according to claim 1, wherein
 the analysis method creation unit creates, when one or a plurality of mass to charge ratios or a mass to charge ratio range are set as a repetitive analysis object as one of the analysis conditions, an analysis method in which one or a plurality of mass to charge ratios or a mass to charge ratio range obtained by removing the mass to charge ratio stored in the background information storage unit from the set mass to charge ratio or the set mass to charge ratio range are used as a repetitive analysis object.

* * * * *